US008264980B2

(12) United States Patent
Blum et al.

(10) Patent No.: US 8,264,980 B2
(45) Date of Patent: Sep. 11, 2012

(54) QUALITY ASSESSMENT OF A COMMUNICATION CONNECTION IN A RADIO-OPERATED MULTI-HOP HAZARD REPORTING SYSTEM

(75) Inventors: Philipp Blum, St. Niklausen (CH); Berni Imfeld, Uster (CH); Simon Künzli, Winterthur (CH)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 12/745,602

(22) PCT Filed: Sep. 2, 2008

(86) PCT No.: PCT/EP2008/061576
§ 371 (c)(1),
(2), (4) Date: Jun. 24, 2010

(87) PCT Pub. No.: WO2009/068332
PCT Pub. Date: Jun. 4, 2009

(65) Prior Publication Data
US 2010/0309804 A1 Dec. 9, 2010

(30) Foreign Application Priority Data
Nov. 30, 2007 (EP) .................................. 07122008

(51) Int. Cl.
*H04L 12/28* (2006.01)
*H04J 3/16* (2006.01)
(52) U.S. Cl. ........................................ 370/252; 370/465
(58) Field of Classification Search .................. 370/252, 370/238, 329, 338, 465
See application file for complete search history.

(56) References Cited

U.S. PATENT DOCUMENTS

| 7,171,229 | B2 * | 1/2007 | Moulsley et al. ............. 455/522 |
| 7,324,448 | B2 * | 1/2008 | Lee et al. ...................... 370/232 |
| 7,583,636 | B2 * | 9/2009 | Moulsley et al. ............. 370/332 |
| 7,861,272 | B2 * | 12/2010 | Russ et al. ...................... 725/74 |
| 8,154,602 | B2 * | 4/2012 | Yamagishi et al. ........... 348/192 |
| 2003/0099205 | A1 * | 5/2003 | Lee et al. ...................... 370/252 |
| 2003/0147453 | A1 * | 8/2003 | Batra ............................ 375/132 |
| 2005/0014464 | A1 * | 1/2005 | Larsson ...................... 455/11.1 |
| 2008/0084833 | A1 * | 4/2008 | Picard .......................... 370/280 |
| 2009/0274135 | A1 * | 11/2009 | Seok ............................ 370/338 |
| 2010/0011244 | A1 * | 1/2010 | Mohamed-Rasheed et al. .............................. 714/18 |

OTHER PUBLICATIONS

Saradhi, et al., "Reliability-Constrained Least-Cost Routing in Multihop Networks", Design of Reliable Communication Networks (DRCN), Oct. 19-22, 2003, pp. 197-202, Banff, Alberta, Canada.

(Continued)

*Primary Examiner* — Andrew Lee
(74) *Attorney, Agent, or Firm* — Laurence A. Greenberg; Werner H. Stemer; Ralph E. Locher (57) ABSTRACT

A method determines a quality of a communication connection between a selected secondary station and a main station of a radio-operated multi-hop hazard reporting system. The method includes the determination of a value of a first parameter for the selected secondary station, the value of the first parameter is indicative of the connection security only between the selected secondary station and the main station. The method further includes a determination of a value of a second parameter for the selected secondary station, wherein the value of the second parameter is indicative of the connection security only between any directly adjacent secondary stations of the selected secondary stations and the main station, and a determination of the quality of the communication connection based only on the value of the first parameter and the value of the second parameter.

17 Claims, 2 Drawing Sheets

OTHER PUBLICATIONS

Chen, et al., "A Reliable Broadcast/Multicast Scheme for Multihop Mobile Ad Hoc Networks", IEICE Trans. Commun., Mar. 2006, pp. 867-878, vol. E89-B, No. 3.

Woo, et al., "Taming the Underlying Challenges of Reliable Multihop Routing in Sensor Networks", Nov. 5-7, 2003, pp. 14-27, Sensys '03, Los Angeles, CA, USA.

* cited by examiner

QUALITY ASSESSMENT OF A COMMUNICATION CONNECTION IN A RADIO-OPERATED MULTI-HOP HAZARD REPORTING SYSTEM

BACKGROUND OF THE INVENTION

Field of the Invention

The present invention relates to the technical field of radio-operated hazard reporting systems. The present invention especially relates to a method for assessing the quality of a communication connection between a selected secondary station of a plurality of secondary stations and a main station of a radio-operated multi-hop hazard reporting system. The present invention further relates to a method for determining the overall status of a radio-operated multi-hop hazard reporting system having a main station and a plurality of secondary stations. The present invention also relates to a selected secondary station for a radio-operated multi-hop hazard reporting system and to a radio-operated multi-hop hazard reporting system which are configured for executing the above-mentioned method for assessing the quality of a communication connection. The present invention also relates to a computer-readable storage medium and to a program element which contain instructions for executing the inventive method for assessing the quality of a communication connection.

Radio-operated multi-hop hazard reporting systems have a main station acting as a central unit and a number of secondary stations, which are connected via a direct radio connection or via an indirect radio connection to the main station. In the case of an indirect radio connection a selected secondary station uses other intermediate secondary stations to forward its transmit signal to the main station. The communication security of a radio connection between the selected secondary station and the main station thus also depends on the functioning of the secondary stations involved in the indirect radio transmission.

In the area of hazard reporting technology the communication security of a hazard reporting system is however of outstanding importance in order to guarantee rapid notification to the main station in the event of a hazard. This can then initiate suitable measures such as the evacuation of a building, the closing or opening of doors, activation of fire extinguisher systems, reporting the incident to a fire department or police control center or the like.

There is a specification known as standard VDE0833 for hazard reporting technology in which for example a rule is described for a specific error which can occur in wired systems. This rule says that not more than 10 manual pushbutton or 32 automatic fire alarms should be disconnected from the system by a short circuit to by an interruption of a connection. In the terminology for wired systems this means that not more than 10 manual pushbutton alarms or 32 automatic alarms may be attached to a spur defined by a single wire connection. Otherwise so-called loops must be used which provide a double wire connection.

By definition this rule means for wireless hazard reporting systems that typically two independent communication paths must exist from each secondary station to the main station. The number of independent communication paths is thus a measure of the quality or of the communication security between a selected secondary station and the main station of a radio-operated multi-hop hazard reporting system.

BREIF SUMMARY OF THE INVENTION

The underlying object of the invention is to specify a method, a selected secondary station, a radio-operated multi-hop hazard reporting system, a computer-readable storage medium as well as a program element for assessing the quality of a communication connection between a selected secondary station and a main station of a radio-operated multi-hop hazard reporting system.

This object is achieved by the subject matter of the independent claims. Advantageous embodiments of the present invention are described in the dependent claims.

In accordance with the first aspect of the invention a method for assessing the quality of a communication connection between a selected secondary station of a plurality of secondary stations to a main station of a radio-operated multi-hop hazard reporting system is described. The described method features (a) determining a value of a first parameter for the selected secondary station, with the value of the first parameter being indicative of the connection security only between the selected secondary station and the main station, (b) determining a value of a second parameter for the selected secondary station, with the value of the second parameter being indicative of the connection securities only between directly adjacent secondary stations of the selected secondary station in each case and the main station, and (c) assessing the quality of the communication connection between the selected secondary station and the main station based only on the value of the first parameter and the value of the second parameter.

The described method is based on the knowledge that the quality of a connection between the selected secondary station and the main station of the radio-operated multi-hop hazard reporting system can be assessed based only on local and currently obtainable information of the selected secondary station (represented by the value of the first parameter) and on information from the direct adjacency of the selected secondary station (represented by the value of the second parameter). This means that the connection quality can be assessed in a resource-saving manner. It is not necessary for the selected secondary station to maintain a complete image of the overall hazard reporting system in a memory.

Direct and/or indirect connections between the respective secondary station and the main station can be taken into account for the connection quality of the selected secondary station and/or all of the directly adjacent secondary stations of the selected secondary station.

The information from the immediate neighborhood of the selected secondary station (represented by the value of the second parameter) can for example be obtained by exchanging data between the selected secondary station and its immediate neighbors. In this case, for a hazard reporting system that has just been constructed, at the beginning the value of the first parameter is available only for the main station, provided the main station can be considered as a selected secondary station at all when considering a borderline case. The value of the second parameter is available at the beginning neither for the main station and nor for a secondary station. This means that the values for the first and the second parameter can only be determined after corresponding data exchange procedures between secondary stations adjacent to one another. In such cases the parameter values can be determined iteratively by repeated data exchange procedures and successively adapted to the actual circumstances.

Provided the described method is carried out by a plurality of all secondary stations of a radio-operated multi-hop hazard reporting system, then each secondary station or each node of the hazard reporting system, merely with information about itself and its directly adjacent secondary stations by an evaluation of the values of the first parameter and of the second parameter, can determine its degree of connectivity and thereby the connection security or the connection quality to the main station.

A further advantage of the described method for assessing the connection quality lies in the fact that, for carrying out the method it is not necessary to know the entire topology of the radio-operated multi-hop hazard reporting system. Thus the connection quality can already be tested, if after switching on at least one component of the multi-hop hazard reporting system, the topology of the hazard reporting system is not yet completely known. This also applies if one or more further secondary stations are added to an already initialized multi-hop hazard reporting system which add further connection to the existing connections and thereby modify the topology of the hazard reporting system. In the method described, new secondary stations can thus be added to the hazard reporting system or stations can be removed from the hazard reporting system without the entire hazard reporting system having to be completely newly initialized.

The main station can also be referred to as a central station of the multi-hop hazard reporting system. In this case it is actually usual but is not absolutely necessary for execution of the method described for the main station to have a transmit unit as well as a receive unit by means of which information can be transferred to the secondary stations.

The secondary stations can also be referred to as peripheral units of the hazard reporting system, which feature a sensor means suitable for detecting at least one hazard situation. The peripheral units can typically be a fire detector, a smoke alarm, an intrusion or burglar alarm detector or a water detector for detecting local or global flooding.

It is pointed out that the term directly adjacent secondary station means that the secondary stations concerned are in direct radio connection with the selected secondary station. The direct radio connection is frequently also referred to as the link.

It is also pointed out that a multi-hop radio hazard reporting system in the sense of the present invention is a radio hazard reporting system in which at least one secondary station is not directly adjacent to the main station. In this case at least the secondary stations have a radio receive and a radio transmit unit in each case. If a hazard is recognized by at least one secondary station then the main station is notified.

In accordance with a further exemplary embodiment of the invention the value of the first parameter depends only (a) on the distance between the selected secondary station and the main station and/or (d) on the number of connections on communication paths independent of one another between the selected secondary station and the main station.

The term communication path in this case refers to a sequence of paired adjacent stations in each case which together define a connection which extends from a start station to a destination station and if necessary runs via a number of intermediate stations. In this case two communication paths are referred to as independent of one another if the communication paths between the two stations do not contain any common nodes.

The term distance of a specific secondary station refers to the number of connections between two paired adjacent stations which lie on the communication path from the secondary station to the main station.

In accordance with a further exemplary embodiment of the invention the value of the second parameter depends only on (a) the distances between directly adjacent secondary stations of the selected secondary station in each case and the main station and (b) the number of communication paths independent of one another between the directly adjacent secondary stations of the selected secondary station and the main station in each case.

This means that in the selected secondary station the information is stored as to the distance and the number of independent communication paths to the main station that the selected secondary station itself and the directly adjacent secondary stations have. The selected secondary station has no knowledge of the distance and the number of independent communication paths to the main station of secondary stations further away.

In accordance with a further exemplary embodiment of the invention only directly adjacent secondary stations are taken into account for the value of the second parameter which by comparison with the selected secondary station have an equal or a smaller distance to the main station. This has the advantage that, to determine the second parameter, only those adjacent secondary stations are taken into account, which are especially relevant for the connection security of the selected station. In addition, by taking into account only the directly adjacent secondary stations, the resources of the selected secondary station can be further preserved. The secondary stations of a radio-operated multi-hop hazard reporting system can consequently each be equipped with a processor which has a comparatively low processing power. Likewise only a comparatively small data memory is required for each secondary station in order to provide the necessary data for executing the method described.

In accordance with the first exemplary embodiment of the invention the method additionally features assigning a status at least to the selected secondary station, with the status being a measure of the number of communication paths independent of one another between the selected secondary station and the main station. This means that the status is a measure of the redundancy of the communication connection between the selected secondary station and the main station. Since a failure of a secondary station can never be entirely excluded, both the security and the reliability of the communication connection are specified by the redundancy of the communication connection.

It is pointed out that the described method can also be carried out for a number or even for all secondary stations of a specific radio-operated multi-hop hazard reporting system. In this case another secondary station is then to be considered as the selected secondary station in each case.

In accordance with a further exemplary embodiment of the invention the method additionally features a classification of the status into different states. The states in such cases can be selected as a function of the respective security requirements of the radio-operated multi-hop hazard reporting system by different thresholds in respect of the number of communication paths independent of one another between the respective selected secondary station and the main station.

Preferably the different states can each be assigned a unique color.

Thus for example the state "red" can mean that the secondary station concerned has no connection to the main station and is thereby isolated from the radio-operated multi-hop hazard reporting system.

The state "amber" can mean that there is at least one connection from the secondary station concerned to the main station, with this connection not however being first fault tolerant according to the Standard VDE0833 for hazard reporting systems described above. In this context first fault tolerant means that, in the event of a failure of a communication path between the secondary station concerned and the main station, at least one further communication path is available via which information can be transferred between the secondary station concerned and the main station.

The state "green" can mean that the secondary station concerned has at least X independent communication paths to the main station, with X being a whole number which is greater than 1. This means that, for a failure of X−1 given secondary stations at least one intact communication path between the secondary station concerned and the main station still exists and can be used for information transmission. For X equals greater than or equal to 2, the connection from the relevant secondary station to the main station is first fault tolerant.

In accordance with a further exemplary embodiment of the invention the method additionally features a display of the current status of the selected secondary station. The display can for example be provided by an optical display. In the case of the assignment of specific colors to the respective state of the selected secondary station, a three-color light emitting diode can be used for example or three light emitting diodes with different colors from one another can be used. In this case the respective color state can be displayed directly on a housing of the respective secondary station.

A suitable visualization makes it possible during testing of the radio-operated multi-hop hazard reporting system to check at any time the state of a secondary station of the radio-operated multi-hop hazard reporting system locally and if necessary to identify a problematical node or a problematical secondary station quickly and reliably.

In accordance with a further exemplary embodiment of the invention the method also features (a) a detection of the directly adjacent secondary stations of the selected secondary station, (b) sending a request relating to the status of the detected directly adjacent secondary stations, and (c) receiving a response in each case from the detected directly adjacent secondary stations, with the response containing information about the respective state of the detected directly adjacent secondary stations.

The method described can thus be executed even during the commissioning of the radio-operated multi-hop hazard reporting system. Since each secondary station only fetches information about itself and its directly adjacent secondary stations, the connection quality can already be assessed at a very early stage. This applies especially to multi-hop hazard reporting systems which are so large that a complete initialization in which the entire topology of the hazard reporting system is experimentally determined would demand a period of at least several multiples of 10 minutes.

During commissioning the secondary stations automatically determine, after being switched on, their directly adjacent stations. In addition the adjacent stations determine their number of connections or the number of independent communication paths to the main station which will be needed in order to reliably send hazard reports to the main station.

The request can be made jointly by a request signal directed to all secondary stations or sequentially by different request signals which are sent individually to the different secondary stations. All method steps can naturally be executed by the selected secondary station.

In accordance with a further exemplary embodiment of the invention the method also features adapting the state of the selected secondary station as a function of the state of the detected directly adjacent secondary stations.

When considering the states of the directly adjacent secondary stations a further state can be introduced. This can for example only be issued if the state determined on the number of own independent communication paths already displays or defines the highest connection security through to the main station. This state which can be designated "green plus", can be issued if at least one predetermined number of directly adjacent secondary stations has the state "green" described above or the state "green plus" described here.

Since the difference between the states "green" and "green plus" is outwardly not relevant as a rule, it is not necessary in the case of the state display described above to also display the state "green plus". In both cases the state "green" can merely be displayed outwardly.

It is pointed out that for allocating the state "green plus" also only the directly adjacent secondary stations can be included which by comparison with the selected secondary station represent so-called "parents". In this context the "parents" of a secondary station are those adjacent secondary stations which have a greater distance than the selected secondary station.

In accordance with a further exemplary embodiment of the invention the method additionally features a further adaptation of the status of the selected secondary station depending on the state of the detected directly adjacent secondary stations.

The state can be adapted at predefined intervals. If this is carried out for a plurality of (selected) secondary stations, then the entire radio-operated multi-hop hazard reporting system can be monitored over the long term by repeated updating of the states of the individual secondary stations.

The adaptation of the state of the individual secondary stations can also be undertaken provided defined rules such as for example the above-mentioned first fault rule are adhered to. This means that usually no information is output to the outside if the state of one or more secondary stations changes without a secondary station assuming a critical state for communication security.

The said method thus describes an iterative assessment of the status of a selected secondary station. During iterative assessment the secondary stations communicate regularly with their directly adjacent secondary stations, and in doing so, exchange information about their status and their distance from the main station. Based on the exchanged information the actual status is re-calculated. In such cases the status of the selected secondary station or of each individual secondary station can rapidly converge to the best possible status. This status or the state of this status is retained provided no further connections between adjacent stations are lost. Provided the status of all secondary stations is "green" or "green plus" for example the entire radio-operated multi-hop hazard reporting system is first fault safe.

In accordance with a further aspect of the invention a method is specified for assessing the overall status of a radio-operated multi-hop hazard reporting system which features a main station and a plurality of secondary stations. The method features (a) execution of the method described above for assessing the quality of a communication connection for at least one selected secondary station, (b) transferring the status of the at least one selected secondary station to the main station, and (c) determining the overall status of the radio-operated multi-hop hazard reporting system based on the at least one transferred status.

The described method for assessing the overall status of the radio-operated multi-hop hazard reporting system is based on the knowledge that a suitable consideration or combination of the status of at least one and preferably of all secondary stations allows a highly-informative overall status to be assessed for the transmission security within the hazard reporting system as a whole. In such cases the overall status can typically be assessed simply through the status of that secondary station which has the worst state in respect of the reliability of its communication connection through to the main station.

The overall status can be displayed in a similar way to the display of the states of the individual secondary stations to the main station. In this way an operator can obtain a rapid overview of the state of the overall hazard reporting system in relation to the communication security of all secondary stations.

It is pointed out that to assess the overall status the first fault rule defined in the above-mentioned standard can also be used. A suitable display, especially at the main station, enables an operator to obtain a rapid overview of the first fault security of the entire hazard reporting system.

In accordance with an exemplary embodiment of the invention the method additionally features presentation of the topology of the multi-hop hazard reporting system, especially by means of a personal computer tool. In this case the term "topology" is to be understood as the totality of all communication connections between a number of secondary stations and the main station, which communication connections guarantee a common data exchange. The topology in such cases is decisive for the fault tolerance of the multi-hop hazard reporting system: Only if alternate communication connections exist between different secondary stations is the operability of the hazard reporting system maintained on failure of individual connections.

The topology can be presented in the known way as a so-called loop-spur topology, which delivers an especially rapid overview of the topology of the multi-hop hazard reporting system.

In accordance with a further aspect of the invention a selective secondary station for a radio-operated multi-hop hazard reporting system is described, which in addition to the selected secondary station, features further secondary stations and a main station. The selected secondary station has (a) a transmit unit for transmitting information to at least one directly adjacent secondary station, (b) a receive unit for receiving information from the at least one directly adjacent secondary station, and (c) a processor which is coupled to the transmit unit and the receive unit. The processor is configured such that the method described above for assessing the quality of the communication connection between a selected secondary station and the main station is able to be executed.

The selected secondary station is based on the knowledge that the above-described method can be executed by a simple implementation of a suitable allocation code on the processor of the radio-operated multi-hop hazard reporting system. The allocation code can be implemented in such cases by means of software and/or by means of a suitable hard-wired hardware on the processor.

In accordance with an exemplary embodiment of the invention the transmit unit and/or the receive unit are merely able to be activated for predetermined periods of time. This has the advantage that in an overall radio-operated multi-hop hazard reporting system the transmit units and/or the receive units of the individual secondary stations and if necessary also the main station are each activated only for specific relatively short periods of time, so that power can be saved in an effective manner during the inactive time. With battery-operated stations this increases the lifetime of the battery used in a significant way. Naturally this also applies to rechargeable batteries.

Preferably each secondary station and if necessary also the main station can be periodically ready-to-receive only for a short moment. The time offset of the corresponding switch-on points can be random and also different for each station. The period duration can also be different to each station. Each station however knows the period duration and the time offset of all adjacent stations. This means especially that each station at each point in time knows the next ready-to-receive time of all adjacent stations.

In accordance with a further aspect of the invention a radio-operated multi-hop hazard reporting system is described which features (a) a main station and (b) a selected secondary station and at least one further secondary station each configured for detecting a hazard and for reporting it to the main station in the event of a detected hazard, with the selected secondary station and at least one further secondary station being coupled via a direct or an indirect radio connection to the main station. The selected secondary station is configured such that the method described above for assessing the quality of a communication connection is able to be executed.

The described hazard reporting system is based on the knowledge that the quality of the radio connection between the selected secondary station and the main station can be assessed only based on locally obtainable information of the selected secondary station and on local information from the immediate vicinity of the selected secondary station. This enables the connection quality to be assessed in a resource-saving manner. It is not necessary for the selected secondary station to keep a complete image of the entire hazard reporting system in a memory. In the described hazard reporting system each secondary station can independently, merely with information about itself and its directly adjacent secondary stations, by an evaluation of the values of the first and the second parameter, determine its degree of connectivity to the main station.

In accordance with a further aspect of the invention a computer-readable storage medium is described in which a program for assessing the quality of a communication connection between a selected secondary station of a plurality of secondary stations and a main station of radio-operated multi-hop hazard reporting system is stored. The program, when executed by a processor of the selected secondary station, causes the selected secondary station to execute the method described above for assessing the quality of a communication connection.

In accordance with a further aspect of the invention a program element for assessing the quality of a communication connection between a selected secondary station of a plurality of secondary stations and the main station of a radio-operated multi-hop hazard reporting system is described.

The program element causes the selected secondary station, when executed by a processor of the selected secondary station, to execute the method described above for assessing the quality of a communication connection.

The program element can be implemented as a computer-readable instruction code in any suitable programming language such as in Java, C++ etc. for example. The program element can be stored on a computer-readable memory medium (CD-Rom, DVD, removable disk, volatile or non-volatile memory, built in memory/processor etc.). The instruction code can program a computer or another programmable device such that the desired functions are executed. Furthermore the program element can be provided in a network such as the Internet for example, from which it can be downloaded by a user if required.

The invention can be realized both by means of a computer program, i.e. software, and also by means of one or more specific electrical circuits, i.e. in hardware or in any given hybrid form, i.e. by means of software components and hardware components.

Further advantages and features of the present invention are produced from the following typical description of currently preferred exemplary embodiments. The individual figures of the drawing of this application are merely to be seen as schematic and not true-to scale.

DESCRIPTION OF THE INVENTION

At this point it remains to be pointed out that in the drawing the reference signs of the same components or of the components that correspond to one another only differ in their first digit.

Figure 1:
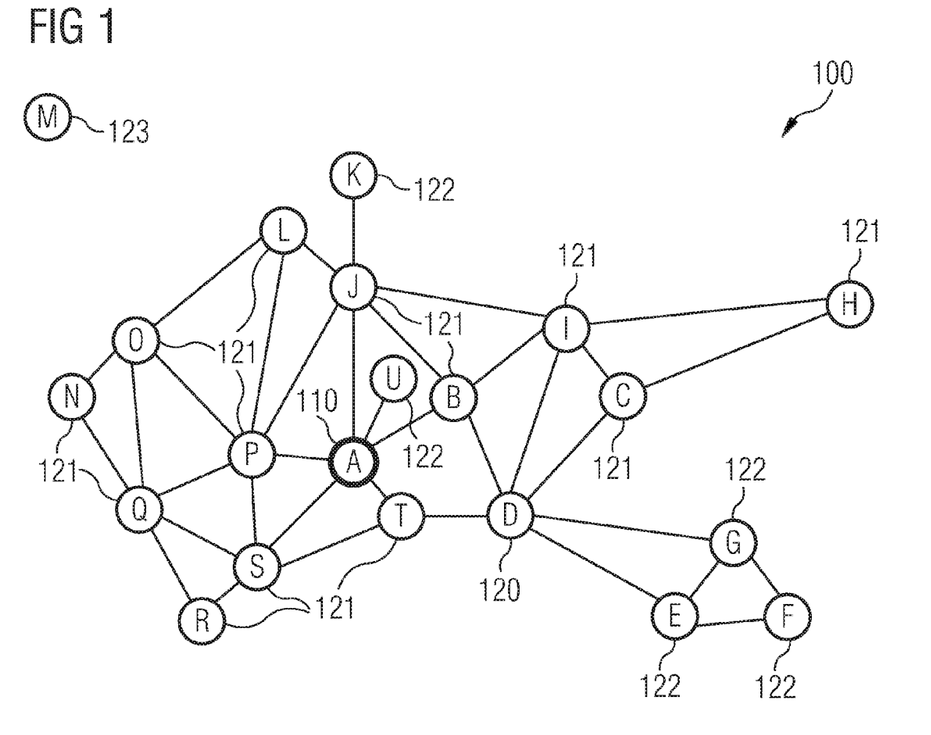
FIG. 1 shows a radio-operated multi-hop hazard reporting system which features a main station and a plurality of secondary stations which are each configured such that they can assess their own connection status to the main station based on local information from themselves and from only the directly adjacent secondary stations.

FIG. 1 shows a radio-operated multi-hop hazard reporting system 100 in accordance with an exemplary embodiment of the invention. The multi-hop hazard reporting system 100 has a main station 110 and a number of secondary stations 120, 121, 122. The main station is labeled with the latter "A". The secondary stations 120, 121, 122 are labeled with the letters "B" to "M". The secondary stations B, J, P, S, T and U are connected via a direct radio connection to the main station A. The other secondary stations C, D, E, F, G, H, I, K, L, N, O, Q and R are connected via an indirect radio connection to the main station A. For the indirect radio connections at least one secondary station is used in each case as an intermediate station for transfer of messages or events. For the secondary station M no connection currently exists to the remaining hazard reporting system 100.

In accordance with the exemplary embodiment shown here the secondary stations 120, 121, 122 configured so that they can assess their own connection status to the main station 110 based on local connection information from themselves and from only the directly adjacent secondary stations. The assessment of the connection status will be described below with reference to the selected secondary station D, which is labeled with the reference sign 120.

To show the number of connections of the selected secondary station 122 to the main station 110 a status is introduced. In accordance with the exemplary embodiment shown here the status of a secondary station 120, 121, 122 can assume the states red, amber or green. An algorithm is described below with which the secondary station 120 can determine its status.

In the algorithm for determining the status of the secondary station 120 only locally available information is used. This information is the actual start status as well as the status of the directly adjacent secondary stations T and B, which are at a shorter distance from the main station A. Optionally the status of the directly adjacent secondary station I can also be taken into consideration which is at the same distance from the main station A as the selected secondary station D. Furthermore the states of the directly adjacent secondary stations C, G and E can also be taken into consideration if necessary, which by comparison with the selected secondary station D, are at a greater distance from the main station A.

It is pointed out that naturally all other secondary stations 121, 122 can also use this algorithm to determine their actual state or their actual status.

In accordance with the exemplary embodiment shown here, a status of "red" means that there is no connection to the main station for the secondary station concerned. In the multi-hop hazard reporting system 100 depicted in FIG. 1 this applies to the secondary station M.

A status of "amber" means that there is at least one connection from the secondary Station 122 concerned to the main station 110 but this connection is not first fault secure however. In such cases first fault secure means that, on failure of a communication path between the relevant secondary station and the main station, at least one further communication path is present via which the information between the relevant secondary station and the main station can be transferred.

The status "green" means that the relevant secondary station 121 has at least X independent communication paths to the main station, with X being a whole number which is greater than 1. In accordance with the exemplary embodiment shown here X is equal to 2. This means that, on failure of any given single secondary station, there will always be at least one intact communication path between the relevant secondary station 120, 121 and the main station 110 and this can be used for information transmission.

Furthermore, in accordance with the exemplary embodiments shown here, the internal state "green plus" is also used. This state signals within the system that the station concerned itself has X or more adjacent so-called parents which likewise currently have the state "green" or the state "green plus". The difference between this state and the state "green" is not relevant externally. In the case of the display for an operator the same display can therefore be used for the state "green plus" as is used for the state "green".

By transferring the status of the secondary stations 120, 121, 122 to the main station 110 a status can be computed for the entire system 100. There are two preferred variants here Variant 1: In the first variant the demand for a reliable communication within the multi-hop hazard reporting system 100 is that each secondary station has the status "green".

Variant 2: In the second variant the first fault rule in accordance with the standard VDE0833 specified above is used, according to which a few secondary stations are also allowed to be only accessible via a single communication path.

Based on these boundary conditions, the following global rules can be set up for assessing the status of the entire multi-hop hazard reporting system 100.

Re. Variant 1:
   If all secondary stations are in the state "green" then the entire multi-hop hazard reporting system is also in the state "green".
   If each secondary station is at least in the state "amber" then the state of the overall system is also "amber".
   If one or more of the secondary stations is in the state "red", then the state of the overall system is also "red". This state can for example be detected by not all available secondary stations being recognized by the main station.

Re. Variant 2:
   If the first fault rule is fulfilled, the state of the entire system is "green".
   If the first fault rule is not fulfilled but each secondary station is accessible via one communication path, then the state of the overall system is "amber".
   If a secondary station is not accessible, then the state of the overall system is "red". Here too this state can be detected by not all available secondary stations being recognized by the main station.

The method which describes the computation of the status of a secondary station is explained below: The secondary stations communicate on a regular basis with their neighboring stations and in doing so exchange information about their current status and about their distance from the main station. Based on this information, the individual secondary stations each compute their own status again. In this case the status of each individual secondary station converges into the best possible state. This state is maintained for as long as no further connections between adjacent secondary stations are lost. Provided the status of all secondary stations is "green" or "green plus" the network is first fault secure.

The rules given below in a table show an example for detection of the status by the secondary stations. Other rules are also possible for the same status information if for example another first fault rule is to be fulfilled:

| Distance | Condition | State Status | Example from FIG. 1 for X = 2; (possible paths) |
|---|---|---|---|
| 0 | First fault secure radio connections | "Green plus" | A; (—) |
| 1 | X-1 peers | "Green" | B; (B -> A; B -> J -> A) |
| 1 | Else; | "Amber" | U; (U -> A) |
| >1 | Number of parents with "Green" or "Green plus" >= X | "Green plus" | Q; (Q -> P -> A; Q -> S -> A) |
| >1 | Number of parents with "Green" or "Green plus" plus number of peers with "Green plus" >= X | "Green" | R; (R -> S -> A; Q -> S -> A) |
| >1 | Number of parents > 0 | "Amber" | K; (K -> J -> A) |
| >1 | Else: | "Red" | M; (—) |

These rules can be applied regularly over and over again for assessing the status of a secondary station. To this end the directly adjacent stations must simply continue to communicate with one another and exchange the appropriate information about their current status and their distance from the main station. This behavior enables the following problems in particular to be resolved which occur in conventional radio-operated multi-hop hazard reporting systems.

Connections between two directly adjacent stations can fail temporally or even permanently.

New connections between two directly adjacent stations between two stations can be added so that a new neighbor relationship is produced.

Stations can disappear from a system for example through a defect or an empty battery.

New stations can be added to the system.

Figure 2:
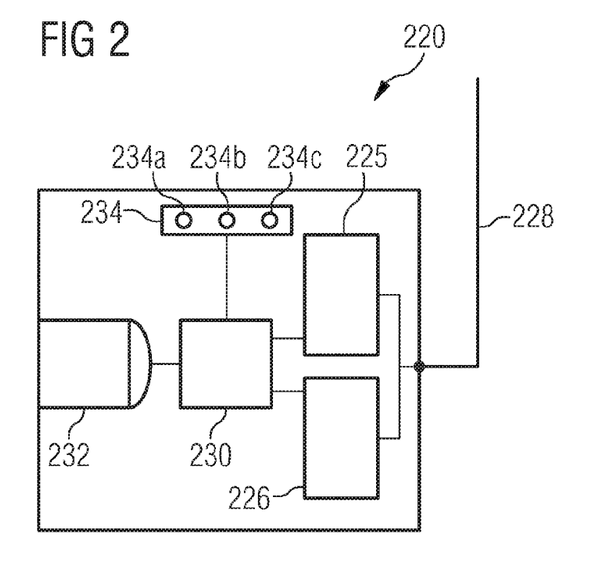
FIG. 2 shows a selected secondary station of the multi-hop hazard reporting system shown in FIG. 1.

FIG. 2 shows a selected secondary station 220 of the multi-hop hazard reporting system 100 shown in FIG. 1. The selected secondary station 220 features a transmit unit 225 for transmitting information to at least one directly adjacent secondary station, a receive unit 226 for receiving information from the at least one directly adjacent secondary station and a processor 230 which is coupled to the transmit unit 225 and to the receive unit 226.

As described above, in order to interrogate the current status of the directly adjacent secondary stations not shown in FIG. 2, the selected secondary station 220 also features an antenna 228 which is coupled to both the transmit unit 225 and also to the receive unit 226.

The processor 230 is configured such that the method described above is able to be executed for assessing the status of the selected secondary station 220. To this end the current status of the selected secondary station 220 is related to the current statuses of the directly adjacent secondary stations in the manner described above and from this the updated status of the selected secondary station 220 is assessed. In this assessment of the current status of the selected secondary station 220 is reflected by the value of a first parameter. The current statuses of the directly adjacent secondary stations are reflected by a value of a second parameter.

The current state of the status of the selected secondary station 220 can be displayed externally by a display device 234. In accordance with the exemplary embodiment described here the display device 234 features a green light emitting diode 234a, an amber light emitting diode 234b and a red light emitting diode 234c for this purpose. In this case the green light emitting diode 234a is used for signaling the states "green" and "green plus" described above, the amber light emitting diode 234b is used to signaling the status "amber" described above and the red light emitting diode 234c is used for signaling the status "red" described above.

Furthermore the selected secondary station 220 also features a detection device 232 coupled to the processor 230 which is for example a fire detector, a smoke alarm, and intrusion or burglar alarm or a water detector for detecting local or global flooding.

Figure 3:
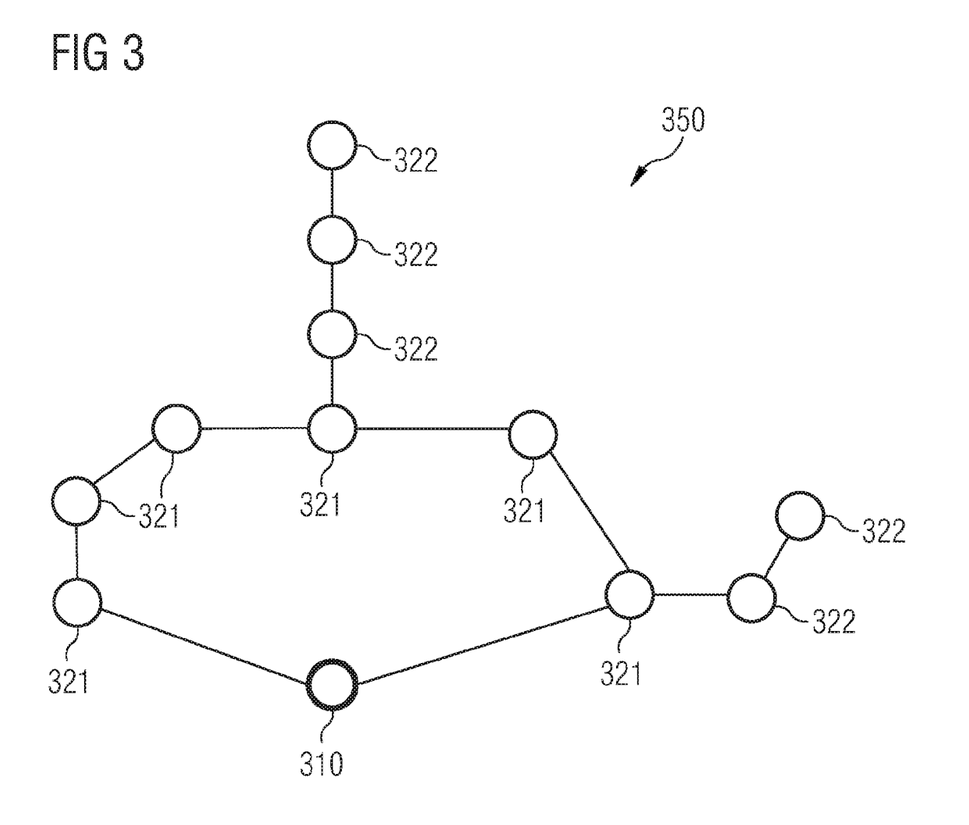
FIG. 3 shows a diagram of a radio-operated multi-hop hazard reporting system in a so-called "loop-spur" technology for display by means of a PC tool.

FIG. 3 shows a diagram 350 of a radio-operated multi-hop hazard reporting system in the so-called "loop-spur" topology. This topology can be assessed by a PC tool in the known way based on the status and on the distance of the individual secondary stations. The diagram 350 allows an operator to obtain an especially rapid overview of the topology of the multi-hop hazard reporting system.

In the "loop-spur" topology shown in FIG. 3 secondary stations with the status "green" defined above represented by the reference sign 321. Secondary stations with the status "amber" defined above are labeled with the reference sign 322. Secondary stations with the state "red" are not present.

It is pointed out that the exemplary embodiments described here merely represent a restricted selection of possible embodiment variants of the invention. It is thus possible to combine the features of individual embodiments in a suitable manner with one another so that for the person skilled in the art a plurality of different embodiments is to be seen as obviously disclosed by the explicit embodiment variants here.

The invention claimed is:

1. A method for assessing a quality of a communication connection between a selected secondary station of a plurality of secondary stations and a main station of a radio-operated multi-hop hazard reporting system, which comprises the steps of:

determining a value of a first parameter for the selected secondary station with the value of the first parameter being indicative of a connection security only between the selected secondary station and the main station;

determining a value of a second parameter for the selected secondary station, with the value of the second parameter being indicative for connection securities only between respective directly adjacent secondary stations of the selected secondary station and the main station; and assessing the quality of the communication connection between the selected secondary station and the main station based only on the value of the first parameter and the value of the second parameter.

2. The method according to claim 1, wherein the value of the first parameter only depends on at least one of a distance between the selected secondary station and the main station and on a number of connections on communication paths independent of one another between the selected secondary station and the main station.

3. The method according to claim 2, wherein the value of the second parameter only depends on distances between the respective directly adjacent secondary stations of the selected secondary station and the main station and on connections on communication paths independent of one another between the respective directly adjacent secondary stations of the selected secondary station and the main station.

4. The method according to claim 3, which further comprises taking into account only the respectively directly adjacent secondary stations for the value of the second parameter, which by comparison with the selected secondary station adds an equal or a smaller distance from the main station.

5. The method according to claim 1, which further comprises assigning a status at least to the selected secondary station, with the status being a measure for a number of communication paths independent of one another between the selected secondary station and the main station.

6. The method according to claim 5, which further comprises classifying the status into different states.

7. The method according to claim 6, which further comprises displaying a current status of the selected secondary station.

8. The method according to claim 5, which further comprises:
 detecting the respectively directly adjacent secondary stations of the selected secondary station;
 transmitting a request concerning the status of the respectively directly adjacent secondary stations detected; and
 receiving a respective response from the respectively directly adjacent secondary stations detected, with a response containing information about a respective status of the respectively directly adjacent secondary stations detected.

9. The method according to claim 8, which further comprises adapting the status of the selected secondary station in dependence on the status of the respectively directly adjacent secondary stations detected.

10. The method according to claim 9, which further comprises further adapting the status of the selected secondary station in dependence on the status of the respectively directly adjacent secondary stations detected.

11. A method for assessing an overall status of a radio-operated multi-hop hazard reporting system having a main station and a plurality of secondary stations, which comprises the steps of:
 determining a value of a first parameter for a selected secondary station with the value of the first parameter being indicative of a connection security only between the selected secondary station and the main station;
 determining a value of a second parameter for the selected secondary station, with the value of the second parameter being indicative for connection securities only between respective directly adjacent secondary stations of the selected secondary station and the main station;
 assessing a quality of the communication connection between the selected secondary station and the main station based only on the value of the first parameter and the value of the second parameter;
 assigning a status at least to the selected secondary station, with the status being a measure for a number of communication paths independent of one another between the selected secondary station and the main station;
 transferring the status of the selected secondary station to the main station; and
 assessing the overall status of the radio-operated multi-hop hazard reporting system based on the status transferred.

12. The method according to claim 11, which further comprises showing a topology of the multi-hop hazard reporting system by means of a personal computer tool.

13. A selected secondary station for a radio-operated multi-hop hazard reporting system having further secondary stations and a main station, the selected secondary station comprising:
 a transmit unit for transmitting information to at least one directly adjacent secondary station;
 a receive unit for receiving information from the at least one directly adjacent secondary station; and
 a processor which is coupled to said transmit unit and to said receive unit, said processor programmed to:
  determine a value of a first parameter for the selected secondary station with the value of the first parameter being indicative of a connection security only between the selected secondary station and the main station;
  determine a value of a second parameter for the selected secondary station, with the value of the second parameter being indicative for connection securities only between respective directly adjacent secondary stations of the selected secondary station and the main station; and
  assess a quality of the communication connection between the selected secondary station and the main station based only on the value of the first parameter and the value of the second parameter.

14. The selected secondary station according to claim 13, wherein at least one of said transmit unit and said receive unit only being able to be activated for predetermined periods of time.

15. A radio-operated multi-hop hazard reporting system, comprising:
 a main station; and
 a selected secondary station and at least one further secondary station each configured for recognizing a hazard and for reporting to said main station in an event of a detected hazard, with said selected secondary station and said at least one further secondary station being coupled via one of a direct and an indirect radio connection to said main station, said selected secondary station programmed to:
  determine a value of a first parameter for the selected secondary station with the value of the first parameter being indicative of a connection security only between the selected secondary station and the main station;
  determine a value of a second parameter for the selected secondary station, with a value of the second parameter being indicative for connection securities only between respective directly adjacent secondary stations of said selected secondary station and said main station; and
  assess a quality of a communication connection between said selected secondary station and said main station based only on the value of the first parameter and the value of the second parameter.

16. A computer-readable storage medium having a program with executable instructions for assessing a quality of a communication connection between a selected secondary station of a plurality of secondary stations and a main station of a radio-operated multi-hop hazard reporting system, the program, when it is executed by a processor of the selected secondary station performing the steps of:
- determining a value of a first parameter for the selected secondary station with the value of the first parameter being indicative of a connection security only between the selected secondary station and the main station;
- determining a value of a second parameter for the selected secondary station with the value of the second parameter being indicative for connection securities only between respective directly adjacent secondary stations of the selected secondary station and the main station; and
- assessing the quality of the communication connection between the selected secondary station and the main station based only on the value of the first parameter and the value of the second parameter.

17. A program element for assessing a quality of a communication connection between a selected secondary station of a plurality of secondary stations and a main station of a radio-operated multi-hop hazard reporting system, with the program element, when it is executed by a processor of the selected secondary station, performing the steps of:
- determining a value of a first parameter for the selected secondary station with the value of the first parameter being indicative of a connection security only between the selected secondary station and the main station;
- determining a value of a second parameter for the selected secondary station with the value of the second parameter being indicative for connection securities only between respective directly adjacent secondary stations of the selected secondary station and the main station; and
- assessing the quality of the communication connection between the selected secondary station and the main station based only on the value of the first parameter and the value of the second parameter.

* * * * *